(12) United States Patent
McDaniel et al.

(10) Patent No.: US 10,148,058 B1
(45) Date of Patent: Dec. 4, 2018

(54) EMISSION CONVERSION AMPLIFIER FOR SOLID STATE LASERS

(71) Applicants: Leidos, Inc., Reston, VA (US); U.S. Department of the Air Force, Washington, DC (US)

(72) Inventors: Sean McDaniel, Dayton, OH (US); Gary Cook, Beavercreek, OH (US)

(73) Assignees: Leidos, Inc., Reston, VA (US); The United States of America, as Represented by the Air Force, Washington, DC (US)

( * ) Notice: Subject to any disclaimer, the term of this patent is extended or adjusted under 35 U.S.C. 154(b) by 0 days.

(21) Appl. No.: 15/438,951

(22) Filed: Feb. 22, 2017

Related U.S. Application Data

(60) Provisional application No. 62/298,608, filed on Feb. 23, 2016.

(51) Int. Cl.
*H01S 3/08* (2006.01)
*H01S 3/042* (2006.01)
*H01S 3/16* (2006.01)

(52) U.S. Cl.
CPC .......... *H01S 3/0809* (2013.01); *H01S 3/042* (2013.01); *H01S 3/1608* (2013.01); *H01S 3/1643* (2013.01)

(58) Field of Classification Search
CPC ...... H01S 3/0809; H01S 3/042; H01S 3/1608; H01S 3/1643
See application file for complete search history.

(56) References Cited

U.S. PATENT DOCUMENTS

| 5,257,275 | A | * | 10/1993 | Trussell | H01S 3/082 372/23 |
| 5,802,086 | A | * | 9/1998 | Hargis | H01S 3/108 372/22 |
| 6,162,213 | A | * | 12/2000 | Stewart | A61B 18/20 606/10 |
| 2008/0198883 | A1 | * | 8/2008 | Vetrovec | F41H 13/005 372/35 |
| 2009/0304033 | A1 | * | 12/2009 | Ogilvy | H01S 3/08059 372/10 |
| 2014/0300950 | A1 | * | 10/2014 | Nowak | H01S 3/10007 359/333 |

(Continued)

FOREIGN PATENT DOCUMENTS

WO    WO 2008052161 A2 *  5/2008  ............. H01S 3/113

OTHER PUBLICATIONS

T. Sanamyan et al. "High power diode-pumped 2.7 μm Er3+:Y2O3 laser with nearly quantum defect-limited efficiency," Optics Express, vol. 19, No. S5, Sep. 2011.*

(Continued)

*Primary Examiner* — Yuanda Zhang
(74) *Attorney, Agent, or Firm* — Dawn-Marie Bey; Bey & Cotropia PLLC

(57) ABSTRACT

Solid state lasers emitting at first and a second wavelengths include an additional a conversion amplifier for converting photons having the first wavelength into photons having the second wavelength, thereby improving output efficiency of a preferred wavelength. Erbium lasing materials such as erbium doped garnets and fluorides, are employed, along with the conversion amplifier formed of a transition metal doped II-VI semiconductor, e.g., Cr:ZnSe.

20 Claims, 12 Drawing Sheets

(56) References Cited

U.S. PATENT DOCUMENTS

2015/0029581 A1* 1/2015 Fan .................. H01S 3/1616
359/341.31
2016/0294149 A1* 10/2016 Vasilyev ............ H01S 3/0612

OTHER PUBLICATIONS

V.V. Fedorov et al. "Energy scaling of nanosecond gain-switched Cr2+:ZnSe lasers," Proc. SPIE 7912, Solid State Lasers XX: Technology and Devices, 79121E, Feb. 15, 2011.*
Aull, B.F., et al., "Vibronic Interactions in Nd:YAG Resulting in Nonreciprocity of Absorption and Stimulated Emission Cross Sections," J. Quantum. Electron., QE-18, No. 5, pp., 925-930, 1982.
Li, et al., "Mid-Infrared Passively Switched Pulsed Dual Wavelength Ho(3+)-Doped Fluoride Fiber Laser at 3 μm and 2 μm," Sci. Rep., 5:10770, Jun. 4, 2015.
Rudy, "Mid-IR Lasers: Power and Pulse Capability Ramp Up for Mid-IR Lasers," Laser Focus World, vol. 50, Issue 5, May 2015.
N. P. Barnes, et al., "Ho:Tm:Er:LuAG and Two Wavelength Oscillation," Solid State Lasers, 10, 211 (1997).
Walsh, Brian M., "Dual Wavelength Lasers," Laser Physics, 20.3 (2010): 622-634.
Li, et al., "Dual Wavelength Q-Switched Cascade Laser," Opt. Lett. 37, 2208-2210 (2012).
Jia, et al., "Simultaneous Q-Switching of a $Tm^{3+}$: ZBLAN Fiber Laser at 1.9 μm and 2.3 μm Using Graphene," IEEE Photonics Technology Letters, vol. 29, No. 4, pp. 405-408, Feb. 15, 2017.
C. Bethea, "Megawatt Power at 1.318μ in Nd3+:YAG and Simultaneous Oscillation at Both 1.06 and 1.318 μm," IEEE Journal of Quantum Electronics, vol. 9, No. 2, pp. 254-254, Feb. 1973.
Shi, W. Q., et al., "Simultaneous, Multiple Wavelength Lasing of (Er, Nd): $Y_3Al_5O_{12}$," Applied Physics Letters 51.16 (1987): 1218-1220.
Walsh, et al., "Cr:Er:Tm:Ho:yttrium Aluminum Garnet Laser Exhibiting Dual Wavelength Lasing at 2.1 and 2.9 μm: Spectroscopy and Laser Performance," Journal of Applied Physics 91.1 (2002): 11-17.

* cited by examiner

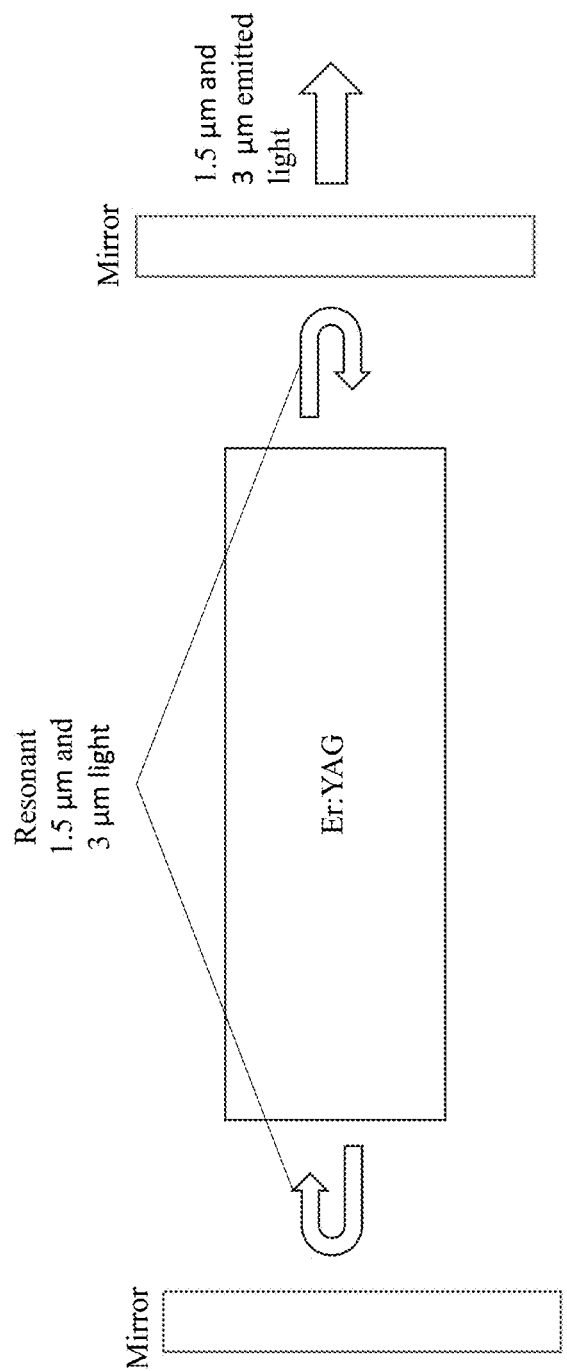
Figure 1 – PRIOR ART

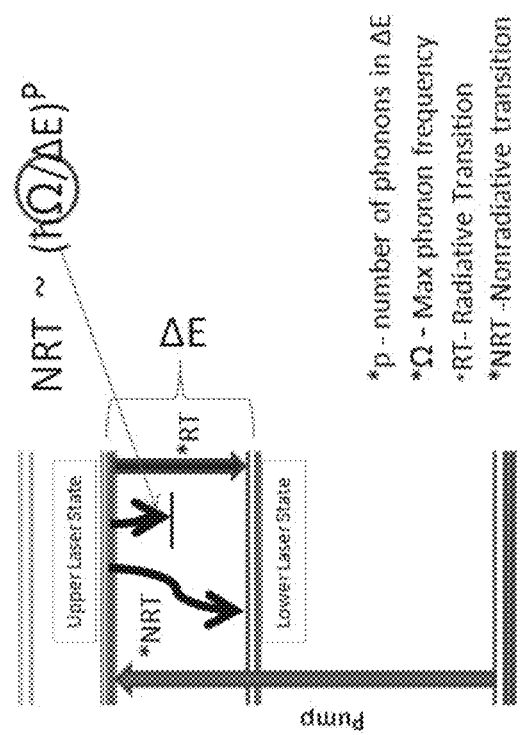
Figure 2 – PRIOR ART

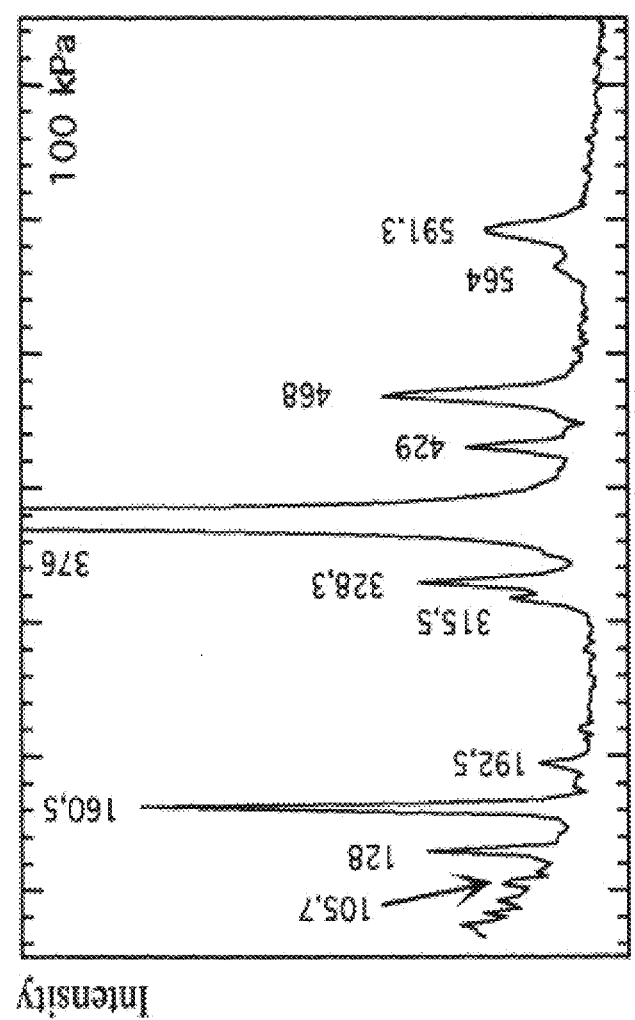
Figure 3 – PRIOR ART

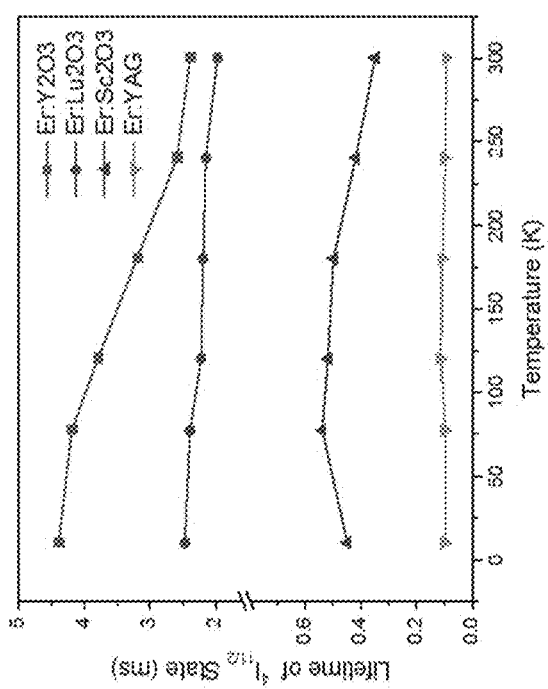
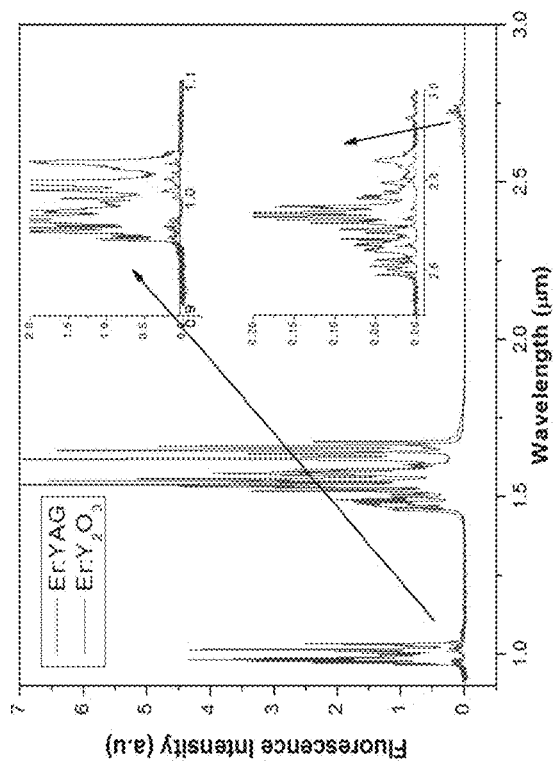
Figure 4a and 4b – PRIOR ART

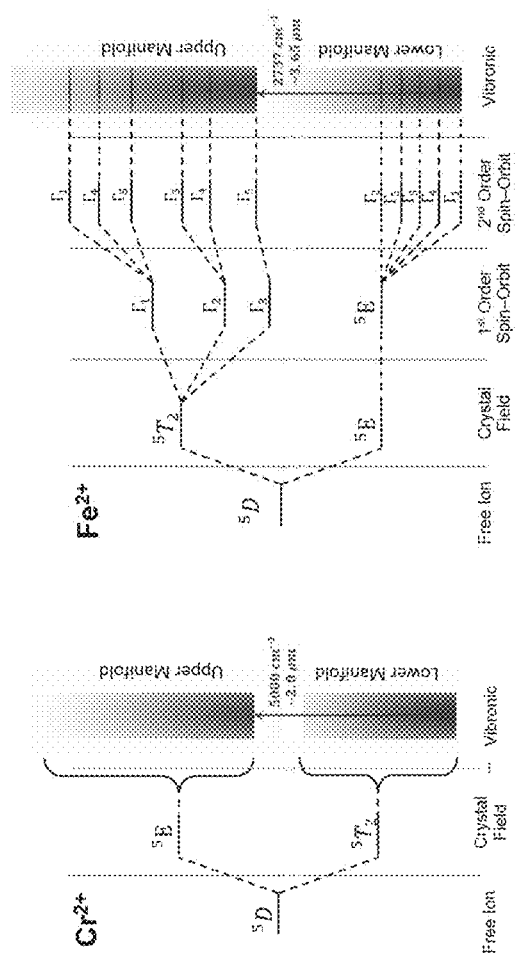
Figure 5 – PRIOR ART

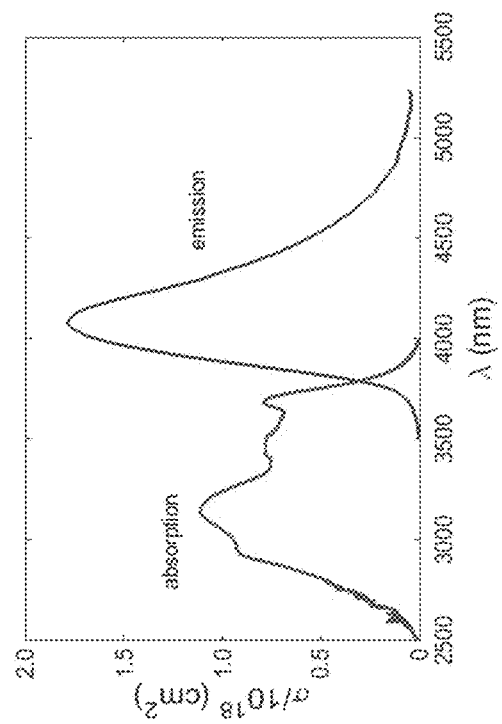
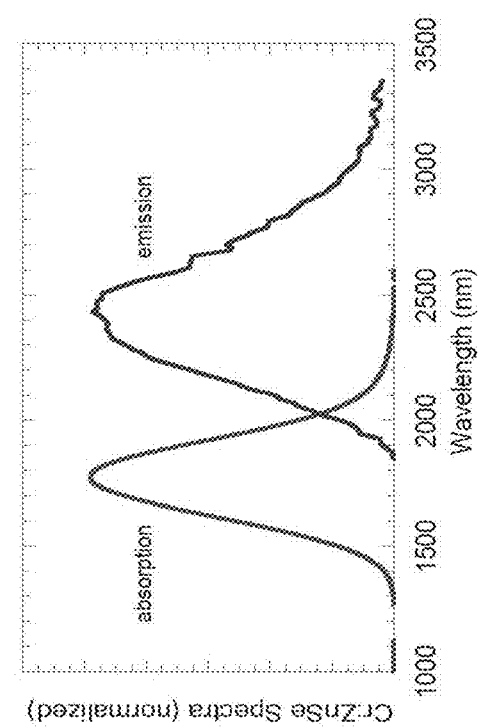
Figure 6a and 6b – PRIOR ART

EMISSION CONVERSION AMPLIFIER FOR SOLID STATE LASERS

CROSS REFERENCE TO RELATED APPLICATIONS

The present application claims benefit of priority to U.S. Provisional Patent Application No. 62/298,608, entitled "Emission Conversion Amplifier for Er:YAG Lasers," filed Feb. 23, 2016, the entirety of which is incorporated herein by reference.

RIGHTS OF THE GOVERNMENT

This invention was made with Government support from the U.S. Air Force pursuant to Contract No. FA8650-12-D-1377. The Government of the United States has the right to practice or have practiced on behalf of the United States this subject invention throughout the world.

BACKGROUND OF THE EMBODIMENTS

Field of the Embodiments

The embodiments are generally directed to high-power mid-IR lasers.

Description of the Related Art

There has been tremendous interest over the last few years in the development of high-power mid-IR lasers in the 2 to 20 p.m range, with particular interest in the 3 to 5 µm region for enabling remote sensing, medical applications and a variety of military applications. The largest technical challenge impeding development of commercial high-power solid-state mid-IR lasers is overcoming the relatively low optical efficiency created by the wavelength mismatch between available high power diode pump lasers and the mid-IR wavelengths of interest. Cascading two or more transitions in solid-state lasers offers a solution for more effective use of absorbed pump energy, and as a result, substantial enhancement of the overall efficiency. Along with efficiency enhancement, cascaded operation also offers effective thermal management and the ability to operate at dual wavelength. The dual-wavelength, or dual-color, operation of the laser offers potential applications in laser microscopy, light detection, and semiconductor processing.

Cascaded lasing demonstrations have been successful in erbium-based solid-state media on the ($^4I_{11/2} \rightarrow ^4I_{13/2} \rightarrow ^4I_{15/2}$) transitions. The $^4I_{11/2} \rightarrow ^4I_{13/2}$ transition corresponds to emission of a mid-IR approximately 2.7 to 3 µm photon and the $^4I_{13/2} \rightarrow ^4I_{15/2}$ transition corresponds to emission of an eye-safe approximately 1.5 to 1.6 µm photon. Both spectral regions are attractive for a variety of important applications. For example, 1.6 µm lasers have found application in eye-safe rangefinders and remote sensing, while 3 µm lasers are useful for hazardous material detection and dental applications.

FIG. 1 illustrates an exemplary prior art configuration wherein Er:YAG is the gain medium. The laser medium is operated in a dual wavelength regime, where both the $^4I_{13/2} \rightarrow ^4I_{15/2}$ (1.6 µm) and the $^4I_{11/2} \rightarrow ^4I_{13/2}$ (3 µm) transition are allowed to oscillate. The mirrors are coated with a thin film such that the one mirror appears to be highly reflective (HR) at 1.6 µm and 3 µm, and the other is partially reflective at 1.6 µm and 3 µm. The downfall of the approach illustrated in FIG. 1 is that the 1.6 µm emission limits the energy available for the 3 µm transition, which is the more useful of the two bands. Thus, for the system of FIG. 1 to be of value for mid-IR laser applications, there remains a need in the art for an improvement to the 3 µm output.

For the majority of mid-IR applications only the mid-IR, approximately 3 µm component is useful, while the 1.6 µm component has no application. Therefore, it is desirable to convert the 1.6 µm emission to the more useful 3 µm to improve the mid-IR laser efficiency. Nonlinear conversion of the 1.6 µm component to the mid-IR waveband could be achieved via Optical Parametric Amplification (OPA), where 1.6 µm can serve as a pump and the 3 µm as a signal wave. Such interactions require high optical intensities to attain reasonable conversion efficiencies. Such intensities could be achieved via Q-switching, but at the expense of additional complication.

Development of mid-IR lasers based on a solid-state host is problematic because longer emission wavelength corresponds to the smaller gap between electronic states of the ion on which the laser action occurs, resulting in thermal quenching of the upper laser state by competing non-radiative transitions from that state, detrimentally affecting the laser operation. FIG. 2 shows a typical energy level configuration for a mid-IR laser. The laser action corresponds to transition between upper and lower states, and the pump, e.g., the emission from a diode laser, corresponding to the transition from ground to upper state. Non-radiative transitions (NRT) from the upper state deplete the upper laser state, shorten the lifetime of the state, and eventually make it difficult, or even impossible, for mid-IR laser to operate.

As the formula in FIG. 2 shows, the probability of NRT is proportional to the so-called maximum phonon frequency $\Omega$ and inversely proportional the energy gap between upper and lower laser states. The maximum phonon frequencies for three classes of materials used as a host for a mid-IR solid-state laser are summarized in Table 1 below. It is seen that chlorides and bromides are better candidates for a mid-IR laser, due to the considerably lower maximum phonon frequency. In the last two decades, there were great efforts in the development of direct diode pumped mid-IR material and lasers near 3-7 µm spectral region, based on low photon materials, involving various rare-earth dopants. Unfortunately, in general these materials have low thermal conductivity, poor mechanical quality and mostly they are hygroscopic. That is one reason that the obtained output data are not particularly impressive.

TABLE 1

| Material | Max Phonon hΩ Frequency (cm$^{-1}$) |
| --- | --- |
| Chlorides/Bromides | 100-200 |
| Fluorides | 300-500 |
| Oxides | 600-1000 |

Accordingly, there remains an unmet need in the art for an overall improved high-power mid-IR laser in the 3-5 µm region with better efficiency, stability, output and reduced cost and complication.

SUMMARY OF THE EMBODIMENTS

In a first exemplary embodiment, a cascaded dual-output laser system includes: a lasing material formed from a rare-earth ion doped material; a pump component for pumping the lasing material to produce at least two optical signals having non-overlapping first and second wavelengths; a conversion amplifier for receiving the at least two optical signals, wherein the conversion amplifier is formed of a material that absorbs photons having the first wavelength and responsive to said absorption emits photons having the second wavelength.

In a second exemplary embodiment, a solid-state laser includes: an oscillation cavity including at least a first mirror, a gain material and a second material for generating a first and a second emission beam having different wavelengths; and a conversion amplifier for converting a first emission beam into a second emission beam.

In a third exemplary embodiment, a rare earth-doped direct amplification laser system includes: a multiple wavelength emission rare earth-doped laser; and a first conversion amplifier for receiving the at least one of the multiple wavelength emissions and converting at least a first of the multiple wavelengths to a second of the multiple wavelengths.

BRIEF DESCRIPTION OF THE FIGURES

The following figures are intended to be considered along with the Detailed Description set forth below:

FIG. 1 is a prior art Er:YAG laser emitting at 1.6 μm and 3 μm;

FIG. 2 shows a typical energy level configuration for a mid-IR laser;

FIG. 3 shows Raman spectrum of the undoped yttria;

FIGS. 4(a) and (b) show the measured lifetimes of $Er^{3+}$ upper state $^4I_{11/2}$ and emission intensities from this state, corresponding to the 1 μm spectrum on $^4I_{11/2} \rightarrow ^4I_{13/2}$ transition;

FIG. 5 shows state diagram of $Cr^{2+}$ and $Fe^{2+}$ in ZnSe;

FIGS. 6a and 6b illustrate the absorption and emission bands of Cr:ZnSe at room temperature (FIG. 6a) and Fe:ZnSe at 80 K (FIG. 6b);

DETAILED DESCRIPTION

Figure 7:
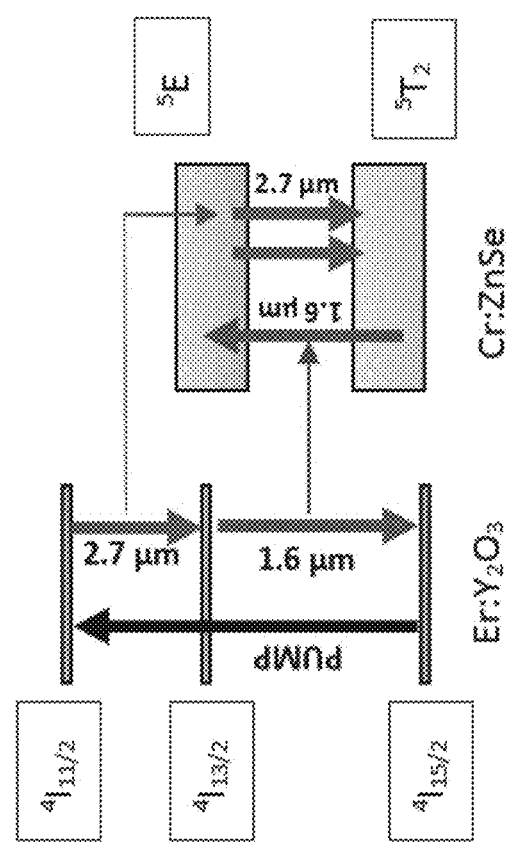
FIG. 7 shows a simplified energy diagram describing the basic concept of doubling the mid-IR efficiency of the cascade $Er:Y_2O_3$ laser by using a Cr:ZnSe optical amplifier for eye-safe to mid-IR conversion.

The preferred embodiments described herein are directed to a greatly improved high-power mid-IR laser utilizing a new class of lasing materials in combination with direct laser amplification in Cr-doped ZnSe. The following embodiments are intended to be representative examples of mid-IR self-amplification laser systems and processes and are in no way intended to be limited to the exemplary materials, emission wavelengths, pumping components or materials specifically referenced. Pump components may include, but are not limited to, optical pumps, including lasers (diode, solid state, liquid dye), flash lamps, arc lamps or other optical sources, as well as possibly electrical pumps (current, beams), chemical pumps and nuclear pumps.

In FIG. 3 the Raman spectrum of the undoped yttria shows that even though the highest peak in the phonon spectrum is near 380 $cm^{-2}$, the 590 $cm^{-1}$ line, having the considerably lower peak, defines the magnitude of NRT from the upper laser states in $Er:Y_2O_3$.

FIGS. 4(a) and (b) show the measured lifetimes of $Er^{3+}$ upper state $^4I_{11/2}$ and emission intensities from this state, corresponding to the 1 μm spectrum on $^4I_{11/2} \rightarrow ^4I_{13/2}$ transition, respectively. As seen from FIG. 4(a), the lifetime of the $^4I_{11/2}$ state of the $Er^{3+}$ ion in most sesquioxides is an order of magnitude longer than for YAG, and in $Y_2O_3$ it has the largest value. As FIG. 4(b) shows, the emission intensities, or quantum efficiency, of the $^4I_{11/2}$ is the largest for $Y_2O_3$ sesquioixdes, which supports selection of $Y_2O_3$ as the preferred material. Additionally, the thermal conductivity of undoped $Y_2O_3$ is 14 W/mK at 300 K, which is higher than the value of 11 W/mK for $Y_3Al_5O_{12}$ (YAG). The first rare-earth laser action was demonstrated on $Eu^{3+}: Y_2O_3$ and $Nd^{3+}: Y_2O_3$; with Er-doped $Y_2O_3$ is one of the most successful laser hosts for mid-IR solid-state lasers near 3 μm spectral range. One skilled in the art recognizes that other materials may be used, including other sesquioixdes, and other recognized lasing materials, e.g., YAG or any suitable rare earth doped material.

Laser operation at cryogenic temperatures offers additional benefits mostly due to significant improvement of thermal and spectroscopic properties. Cryogenic cooling can effectively control various material parameters, such as thermal conductivity and thermal expansion, absorption and emission strength, and consequently the stimulated emission cross section and laser threshold. It has been shown that near 77 K, the thermal conductivity k, thermal expansion coefficient α, and thermo-optic coefficient dn/dT are significantly reduced as compared to room temperature. At liquid nitrogen temperature, thermal properties can improve sometimes by an order of magnitude, while the peak stimulated emission coefficient increases on average by a factor 5-8. The lifetime of metastable laser states may significantly increase as well. Furthermore, the thermal aberrations can decrease by a factor of 10 resulting in excellent laser beam quality. Finally, in many cases the cryogenic cooling also offers substantial improvement to the quantum efficiency and deactivation of the terminal laser state to achieve true four-level operation. Accordingly, in a preferred embodiment, the initial dual energy laser operation is conducted in a cryogenic environment, such as a liquid nitrogen Dewar.

The preferred embodiment also benefits from the use of transparent, laser-grade ceramics, as an alternative to the conventional melt-growth of a single crystal. Ceramic lasers have numerous advantages over their single-crystalline counterparts. First, ceramics can be produced in large volumes, which makes them attractive for high-power laser generation. Second, they can provide a gain medium with high beam quality and can also be made into composite laser media with complicated structures that would otherwise be difficult to fabricate. Besides, ceramics can be heavily and homogeneously doped with laser-active ions. They can also be used to fabricate novel laser materials, which cannot be produced by the conventional single-crystal-growth process. As a rule, ceramic lasers have higher resistance to laser damage and mechanical fracture.

Optically active transition metal (TM) ions integrate into chalcogenide hosts such as ZnSe via substitution at zinc sites and take on a 2+ valence state. For Cr and Fe ions, two electrons are taken from the 3s subshell and the 2+ valence gives rise to $d^4$ and $d^6$ electronic configurations respectively. These two configurations are complementary and undergo similar transformations under symmetric Coulomb perturbations from nearest neighbor ions in a tetrahedral crystal lattice. Such perturbations give rise to crystal-field splitting of the ground state of the ion into distinct manifolds which are further split by spin-orbit perturbations and shown in FIG. 5. FIG. 5 shows state diagram of $Cr^{2+}$ and $Fe^{2+}$ in ZnSe. The $Cr^{2+}$ diagram omits spin-orbit splitting, but these effects are not absent in Cr:ZnSe.

So, in contrast to rare-earth lasers, which typically operate via inter-term transitions between energy levels arising from spin-orbit splitting, transition metal lasers typical operate on intra-term transitions. Thus, the photon energies associated with transition metal lasers are often much smaller than their rare-earth counterparts, placing them in the mid-infrared (IR) spectral band. The crystal field energy of the $Cr^{2+}$ ion in ZnSe is approximately 5000 $cm^{-1}$, while it is approximately 2740 $cm^{-1}$ for $Fe^{2+}$ due to the two additional electrons in its 3d subshell. While fiber lasers for pumping the 1500-2000 nm absorption band of Cr:ZnSe have been available for many years, stable pump lasers in the 2600-3400 nm absorption band of Fe:ZnSe have only recently become available and many Fe:ZnSe laser experiments have been pump-limited.

Unlike in rare-earth ions, whose most weakly bound electrons typically occupy f-orbitals which are shielded from external perturbations by larger d-orbitals, the most weakly bound electrons of transition metal ions typically occupy d-orbitals and are not shielded from the dynamics of their crystal environmental. This sensitivity to their environment is also seen as a direct coupling between the electronic energy levels of the TM ion and the vibration energy levels of the host crystal. Thus, the optical transitions of TM in crystals are assisted by multi-phonon transitions which give rise to ultra-broad absorption and emission bands (see FIGS. 6a and 6b). The probability of parasitic multi-phonon decay increases with temperature and decreases with transition energy; thus, while Cr:ZnSe is typically operated near room temperature, Fe:ZnSe lasers are often, but not always, cooled using liquid nitrogen to mitigate parasitic processes. FIGS. 6a and 6b illustrate the absorption and emission bands of Cr:ZnSe at room temperature (FIG. 6a) and Fe:ZnSe at 80 K (FIG. 6b).

Power amplifiers using Cr:ZnSe have been demonstrated in high-performance amplifier configurations. The preferred embodiment utilizes direct laser amplification in Cr:ZnSe in a cascaded dual-output Er' laser system. The spectroscopic properties of Cr:ZnSe perfectly match use as an optical amplifier for the 2.74 μm component of an Er:$Y_2O_3$ laser using the 1.6 μm output of that same laser as a pump. Thus, a "2-for-1" photon scheme is realized with potential application for high-efficiency generation of tunable radiation in the 3750-5000 nm atmospheric transmission band of interest for many military applications.

FIG. 7 shows a simplified energy diagram describing the basic concept of doubling the mid-IR efficiency of the cascade Er:$Y_2O_3$ laser by using a Cr:ZnSe optical amplifier for eye-safe to mid-IR conversion. A diode pumped Er:$Y_2O_3$ laser, operating in the cascade mode on the $^4I_{11/2} \rightarrow {}^4I_{13/2}$ and $^4I_{13/2} \rightarrow {}^4I_{15/2}$ transitions of the $Er^{3+}$ ion delivers the optical power to the Cr:ZnSe amplifier at two wavelengths, 1.6 and 2.7 μm, along the same optical path. In this scenario, the pump power at 1.6 μm is absorbed and excites the upper $^5E$ state of the $Cr^{2+}$ ions, and the collinear 2.7 μm signal beam following the same path serves as a seed/signal for the Cr:ZnSe amplifier on the $^5E \rightarrow {}^5T_2$ transition of the $Cr^{2+}$ ion.

In the ideal system, each absorbed 1.6 μm photon will eventually re-emit a 2.7 μm photon. Ideally, the 1.6→2.7 μm power conversion scheme then is limited only by the quantum defect between 1.6 and 2.7 μm wavelengths, or ~60%. Consequently, incorporation of the Cr:ZnSe amplifier to the cascade Er:$Y_2O_3$ laser system will double the overall theoretical efficiency of the mid-IR 2.7 μm erbium laser from 36% to 72%, wherein $$\text{Quantum limit from a diode pump } \eta = \frac{980 \text{ nm}}{2740 \text{ nm}} \approx 36\% \quad (1)$$

Figure 8:
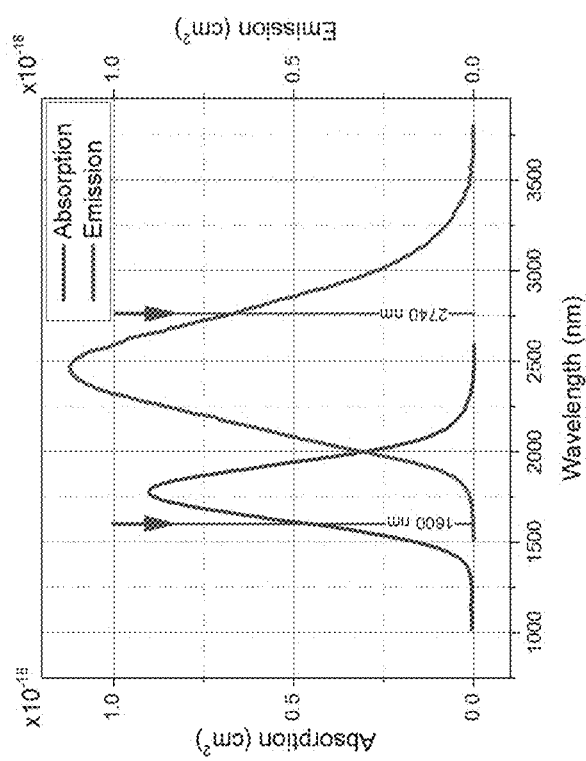
FIG. 8 shows absorption and fluorescence spectra of Cr:ZnSe material.

Due to the broadband nature of both absorption and fluorescence spectra of Cr:ZnSe material, as it is presented in FIG. 8, this approach holds for the majority of erbium lasers. The 1.6 and 2.7 μm are collinear, with estimated collinearity of the pump and signal beam ~0.2 mrad.

The following numerical model is applied to the qualitative interpretation of experimental results for the laser Cr:ZnSe amplifier performance and limitations. The rate equations governing the temporal dependence of $Cr^{2+}$ ion densities at $^5E$ and $^5T_2$ states for the two-level Cr:ZnSe system are:

$$\frac{dN_E(x, y, z)}{dt} = -\frac{\sigma I(x, y, z)}{h\upsilon}(f_E N_E(x, y, z) - f_G N_G(x, y, z)) - \frac{N_E(x, y, z)}{\tau} + R(x, y, z), \quad (2)$$

$$\frac{dN_G(x, y, z)}{dt} = \frac{\sigma I(x, y, z)}{h\upsilon}(f_E N_E(x, y, z) - f_G N_G(x, y, z)) + \frac{N_G(x, y, z)}{\tau} - R(x, y, z),$$

$$\int (N_G + N_E) dx dy dz = N_0$$

In the introduced reference system, Z is chosen parallel to the beam propagation direction along largest dimension of the gain medium. I and σ are the laser intensity and emission cross-section for the 2.7 μm transition, $N_E$, $N_G$ are excited and ground state populations and $f_E$, $f_G$ are the Boltzmann distribution correction factors, respectively. $N_o$ is the fixed total dopant concentration, hυ—is the 2.7 μm photon energy, τ—is the lifetime of the excited $^5E$ state, typically ~4-7 μs for moderate $Cr^{2+}$ concentrations, and R(x,y,z) is the pump rate.

In the exemplary case of longitudinally propagating pump and signal beams, all variables in (2) depend on all space coordinates x, y, z of the gain medium. The longitudinal non-uniformity arises from both: absorption of the pump and amplification of the signal radiation as these two beams traverse the Cr:ZnSe slab in the Z-direction. The transverse non-uniformity arises from the multimode pseudo-Gaussian-like shape of both pump and signal laser beams. The accurate solution of (2) for the arbitrary initial conditions requires relatively complicated numerical simulation. However, for our intention of crude qualitative analysis, the equation (2) can be solved analytically, in the assumption that all variables in (2) are uniform, spatially-independent and can be substituted by their mean values found by averaging over the spatial regions occupied by the pump and signal beams. More specifically, I in (2) can be substituted by $(I_{in}+I_{out})/2$, where $I_{in}$ and $I_{out}$ are the intensities of the 2.7 μm beam at the entrance and exit surfaces of the Cr:ZnSe medium, respectively. Furthermore, $N_E(x, y, z)$ in (1) can be replaced by uniform averaged value $N_E=P_{1.6}/V_{1.6}/h\upsilon$, where P, $V_{1.6}$ and $\upsilon$ are the absorbed power, volume and the optical frequency of the 1.6 μm beam. The equation (2) can be simplified even further by assuming that there is practically no overlap between emission and absorption spectra of $Cr^{2+}$, inferring $f_G=0$, $f_E=1$. Moreover, since the pump duration exceeds by more than three orders of magnitude the lifetime of $Cr^{2+}$ upper state, the time dependence in (2) can be omitted, then consequently the equation (2) will reduce to $$0 = -\frac{\sigma I}{h\upsilon}N_E - \frac{N_E}{\tau} + R(x, y, z), \quad (3)$$

$$0 = \frac{\sigma I}{h\upsilon}N_E + \frac{N_E}{\tau} - R(x, y, z),$$

$$N_G + N_E = N_0.$$

Using the assumption that all variables in (2) such as gain coefficient, power intensity, inverse population, pump rate, etc. are averages over the volume occupied by the 2.7 μm signal beam in the gain medium produces the analytical result (3) that greatly reduces the computational overhead needed to estimate the single pass gain of the Cr:ZnSe amplifier.

For further analysis, two parameters are introduced: power and quantum conversion efficiencies, PE and QE. PE is defined as the ratio of the power extracted from the Cr:ZnSe amplifier at 2.7 μm to the power absorbed at 1.6 μm. Similarly, QE as a ratio of the number of 2.7 μm photons extracted from the amplifier to number of 1.6 μm photons absorbed in the same. Then, the quantum conversion efficiency is $$QE = \left(\frac{\sigma I}{h\upsilon}N_E\right) / \left(\frac{\sigma I}{h\upsilon}N_E + \frac{N_E}{\tau}\right), \quad (4)$$

or more concisely $$QE = W_S / (W_S + W_R). \quad (5)$$

Here $W_S$ and $W_R$ correspond respectively to the probabilities of stimulated and radiative transitions from the $^5E$ state of the $Cr^{2+}$ ion. The relation between power and quantum conversion efficiency is $PE=QE\cdot(\upsilon_{2.7}/\upsilon_{1.6})$, or $PE=0.6\cdot QE$. In the case for incomplete overlap of two beams, one needs to modify (4) by introducing a correction factor of $V_{1.6}/V_{2.7}$, where $V_{1.6}$ and $V_{2.7}$ are the volumes occupied by 1.6 and 2.7 μm beams respectively. In this case, the power efficiency becomes $PE=QE\cdot(\upsilon_{2.7}/\upsilon_{1.6})\cdot(V_{1.6}/V_{2.7})$. It is important to note that QE in (4) and (5) reaches its maximum theoretical value of approximately 60% when the beam overlap factor is unity and $I_{2.7}$ approaches infinity.

The cross-section $\sigma$ in equations (4) and (5) can be found from the fluorescence spectrum of the Cr:ZnSe corresponding to the $^5E \rightarrow ^5T_2$ transition of the $Cr^{2+}$ ion. For that purpose, we have measured both fluorescence and absorption spectra of the Cr:ZnSe sample used in the laser experiment. Then the emission cross section $\sigma$ was determined from the recorded fluorescence spectrum using the well-known Füchtbauer-Ladenberg relation, slightly modified and formulated in Aull B. F. et al., Vibronic Interactions in Nd:YAG Resulting in Nonreciprocity of Absorption and Stimulated Emission Cross Sections, J. Quantum. Electron. 1982, QE-18, No 5, 925-930, which is incorporated herein by reference. The absorption cross section were calculated from the simple relation between the emission cross-section $\sigma$ and the absorption coefficient $\alpha$, i.e. $\sigma_{abs}=\alpha/N_0$, where $N_0$ is the total $Cr^{2+}$ concentration (already defined above). The emission and absorption cross-sections of $Cr^{2+}$ in ZnSe are plotted in FIG. 8. Arrows above the spectra in FIG. 8 point out the exact position of the cascade $Er:Y_2O_3$ laser emission spectra, showing that both lines are slightly off from the $Cr^{2+}$ absorption and emission peaks of Cr:ZnSe. The exact cross section values corresponding to the absorption at the 1.6 μm and the emission at 2.7 μm from FIG. 8, are $4.5\times10^{-19}$ and $7.0\times10^{-19}$ cm² respectively.

Figure 9:
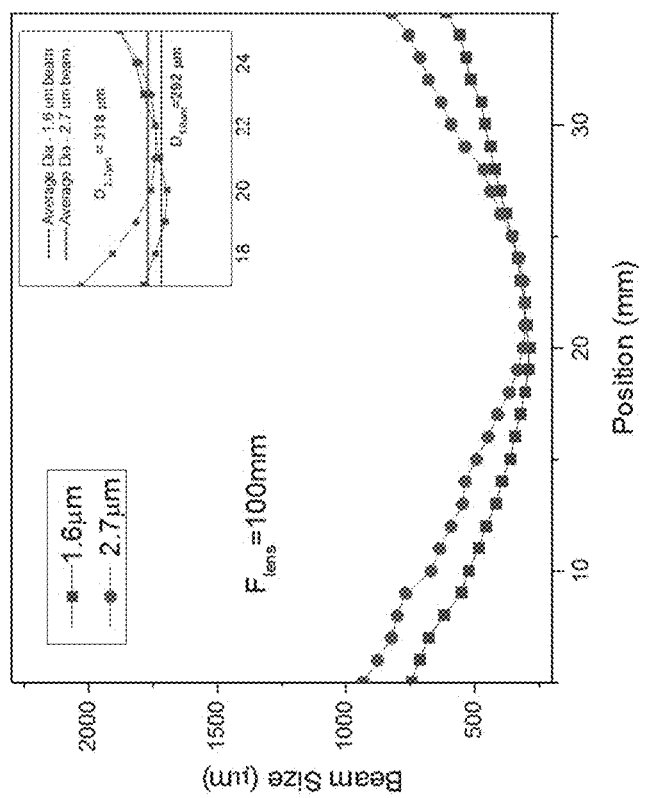
FIG. 9 shows diameters of the 1.6 and 2.7 μm beams as a function of the distance from a focusing lens.

The diameters of the 1.6 and 2.7 μm beams as a function of the distance from the focusing lens are shown in FIG. 9. FIG. 9 shows a slight mismatch in both size and waist locations of the 1.6 and 2.7 μm beams, indicating that the spatial regions occupied by 1.6 and 2.7 μm beams are unequal. This mismatch between the two beam diameters apparently originates from the large mismatch between mode sizes of the laser cavity owing to the large wavelengths difference of 1.6 and 2.7 μm beams, while the mismatch between foci locations results from the chromatic aberration of the focusing lens. The 1.6 and 2.7 μm beams can be approximated by two cylindrical volumes with diameters $D_{1.6}$ and $D_{2.7}$, found from averaging the beam size data along the Cr:ZnSe length as is shown in the inset of FIG. 9. Knowing the beam diameters $D_{1.6}$ and $D_{2.7}$, both the power density and volume overlap correction factor for 1.6 and 2.7 μm beams can be readily calculated. The ratio of the 2.7 and 1.6 μm beam volumes is found to be 0.84. This mismatch of beams overlap was partly responsible for observed efficiencies less than the theoretically predicted values.

Initial experimental power measurements express the power conversion efficiency PE as the ratio of extracted 2.7 μm and absorbed 1.6 μm power as $PE=(P_{2, 2.7}-P_{1, 2.7})/P_{1.6}$, where $P_{1, 2.7}$ and $P_{2, 2.7}$ are the 2.7 μm power measured with and without the beam splitter used in the experimental set-up (not shown), and $P_{1.6}$ is the 1.6 μm power absorbed in Cr:ZnSe. The power and quantum conversion efficiencies PE and QE as a function of the incident 2.7 μm power are plotted in FIGS. 10a and 10b. Since we lack independent control of the 1.6 μm pump power, in FIGS. 10a and 10b, these values are provided and labeled above each of the relevant 2.7 μm power data point. As seen from FIGS. 10a and 10b at the maximum 1.6 μm pump power, PE and QE are 0.3 and 0.5 respectively.

Figure 10B:
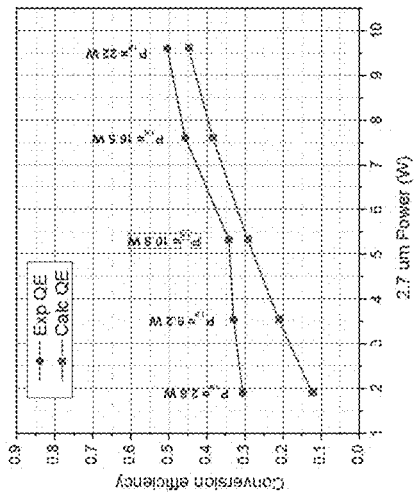
FIGS. 10a and 10b plot power and quantum conversion efficiencies PE and QE as a function of the incident 2.7 μm power.
Figure 10A:
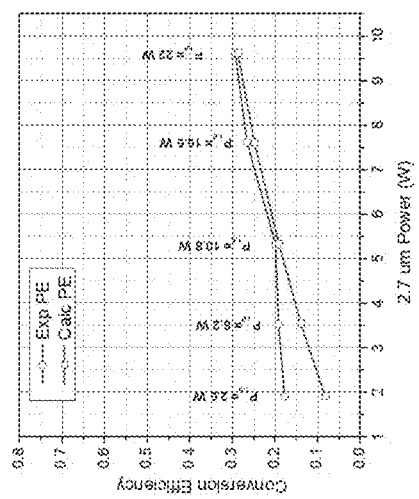

In calculations of the data plotted in FIGS. 10a and 10b, the following material parameters were employed: stimulated emission cross section at 2.74 μm-$7\times10^{-19}$ cm², the lifetime of the $^5E$ upper laser level $\tau$—6 μs, the average diameter of the 2.74 μm beam—320 μm and volume mismatch correction factor—0.84. As FIGS. 10a and 10b show, at the maximum power values of both 1.6 and 2.7 μm beams, the power and quantum efficiency are 0.3 and 0.5, about half of theoretically allowed values of 0.6 and 1 respectively. Differences between the experimental and calculated data are easily explained by the fact that the experimental model was based on numerous approximations.

The embodiment discussed above shows that a Cr:ZnSe material is perfectly suited for an efficient amplification of the mid-IR radiation of the cascade $Er:Y_2O_3$ laser due to unique spectroscopic properties of divalent $Cr^{2+}$ ions in ZnSe. The mid-IR 2.7 μm radiation is amplified at the $Cr^{2+}$ $^5E \rightarrow ^5T_2$ transition, which initial $^5E$ state is inverted due the absorption of the collinearly propagating 1.6 μm radiation, emerging from the same cascade laser. Experimental results demonstrate a maximum ~30% power conversion and 50% quantum efficiency respectively. And due to the broad nature of both Cr emission and absorption bands, this approach is expected to result in similar behavior for any Er-based laser. The efficiency of mid-IR erbium lasers can be doubled from conventional, limited to the quantum defect of approximately 36% to 72%.

Further it is submitted that one skilled in the art recognizes that the advantages of a cascade Erbium rare earth laser pumping/seeding a Cr:ZnSe conversion amplifier extend to other laser systems. The enhanced 2.7 µm component is an ideal source for Fe:ZnSe based mid-IR lasers operating at 4-4.2 µm or ZGP-based OPOs operating in the 4-11 µm spectral range.

While the embodiment discussed in detail above describes a rare-earth ion doped sesquioxide as the lasing material, the embodiments are not so limited. One skilled in the art recognizes that other materials may benefit from operation in the conversion amplifier configuration, including, but not limited to, suitable rare earth doped crystalline or glass hosts such as, garnets, fluorides and glasses. Suitable rare earth materials include
dysprosium (Dy), erbium (Er), europium (Eu), holmium (Ho), lanthanum (La), lutetium (Lu), neodymium (Nd), praseodymium (Pr), promethium (Pm), samarium (Sm), scandium (Sc), terbium (Tb), thulium (Tm), and yttrium (Y).

As discussed in the provisional patent application, other rare earth gain materials, e.g., an Er:YAG laser, also benefit from a conversion amplifier as discussed therein. The Er:YAG laser is designed to emit at both 1.5 µm and 3 µm simultaneously. This alleviates the "bottleneck" of the 1.5 µm transition, which hampers the 3 µm transition. However, simultaneous lasing of the 1.5 µm and 3 µm transitions limits the total amount of energy available for the 3 µm transition. A conversion amplifier comprised of Cr:ZnSe/Cr:ZnS or another suitable material may be placed externally or intracavity with the Er:YAG gain medium to convert 1.5 µm emission to 3 µm. The conversion amplifier utilizes a solid-state medium such as Cr:ZnSe/Cr:ZnS, a nonlinear medium such as an OPO (bulk or periodic) or a Raman medium such as Potassium Gadolinium Tungstate (KGW).

Figure 11:
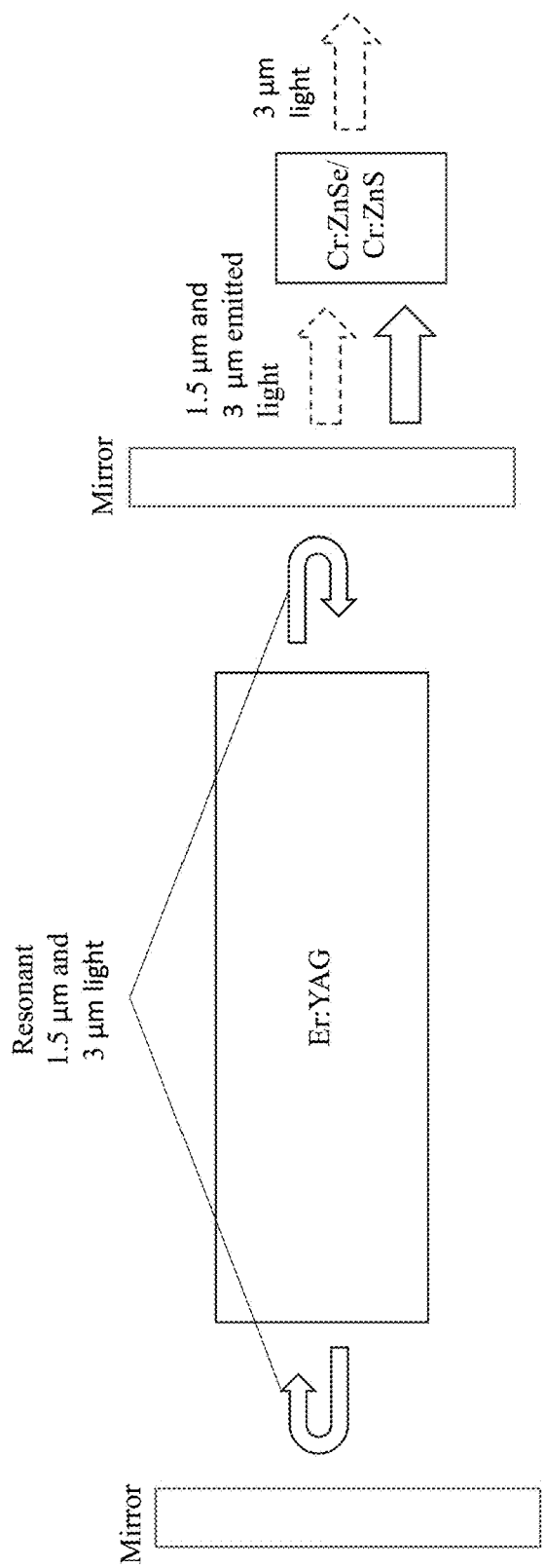
FIG. 11 is a schematic of an Er:YAG laser with a conversion amplifier located external to the lasing cavity.

The downfall of the prior art approach illustrated in FIG. 1 is that the 1.5 µm emission limits the energy available for the 3 µm transition. The transition characteristics of the gain medium cannot be changed; thus, a conversion amplifier is employed to increase the 3 µm emission. The conversion amplifier material is selected in accordance with satisfaction of two requirements. The first requirement is that the material must absorb at one of the oscillating wavelengths. The second requirement is that the material must then emit at the other oscillating wavelength. Of course, this assumes a solid-state amplifier medium. In a first preferred embodiment, the conversion amplifier utilizes a solid-state medium, nonlinear medium or a Raman medium. In the case of Er:YAG, both Cr:ZnSe and Cr:ZnS satisfy these requirements. Thus, a conversion amplifier can be utilized to increase 3 µm output in a configuration shown in FIGS. 11 and 12. Further to FIG. 11, the conversion amplifier is located external to the lasing cavity as shown.

On skilled in the art recognizes that other transition metal doped II-VI Chalcogenides, rare-earth materials, or nonlinear materials may be used for the conversion amplifier.

Figure 12:
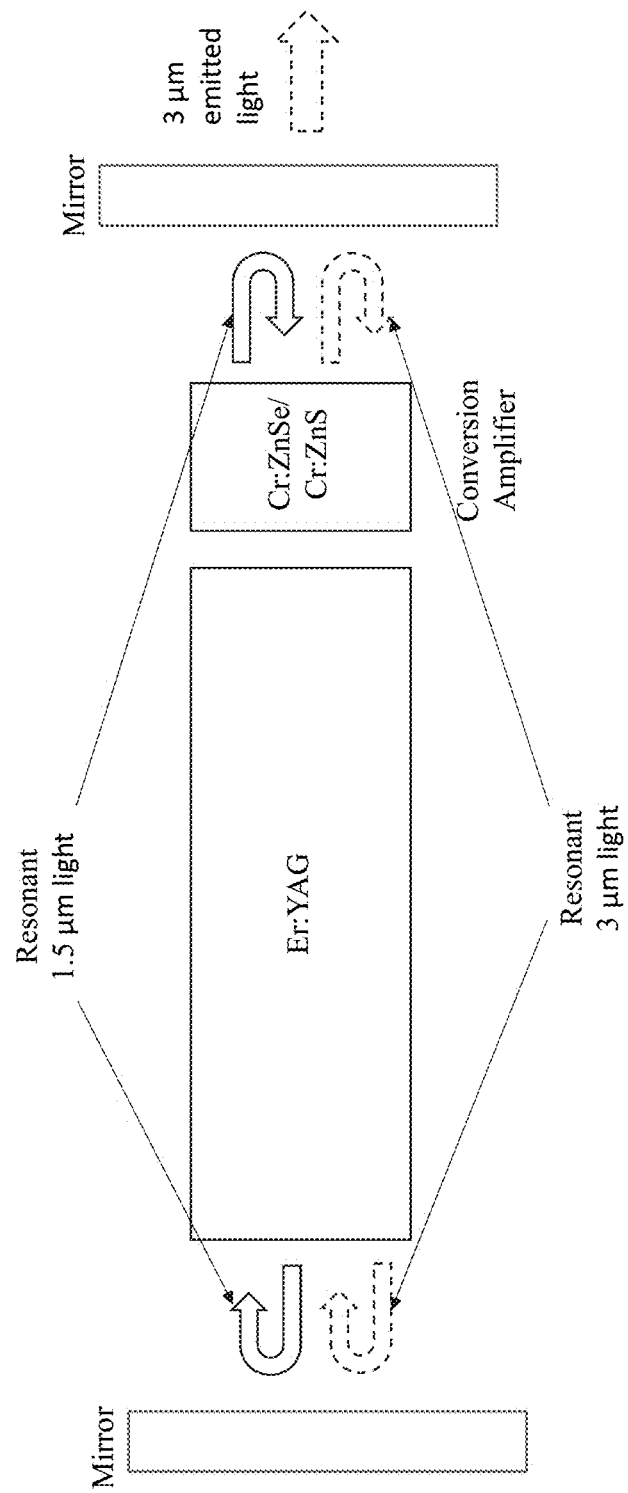
FIG. 12 is a schematic of an Er:YAG laser with a conversion amplifier located intracavity.

In an alternative configuration shown in FIG. 12, the conversion amplifier is located intracavity and is designed such that the 1.5 µm light will experience such high losses that no lasing action will occur, leaving only emission at 3 µm. The conversion amplifier can be either a short, highly doped sample or a long, lightly doped sample depending on the desired laser performance.

In yet a further embodiment, the self-amplification process described herein is not limited to a dual laser output or a single amplification. Given suitable pumping, some lasing materials emit, simultaneously, at more than two wavelengths. For example, in addition to multiple other wavelengths, Er (discussed above) and Ho ions have 4 micron emissions when suitably pumped using a shorter wavelength light source. In this situation, the laser material may laser simultaneously at three (or more) wavelengths, e.g., 1.5 (and/or 2.0), 3 and 4 microns. Thus, a Cr:ZnSe (or similar) conversion amplifier can be used to amplify the 1.5 (and/or 2.0) and 3 micron emissions, as described above. Further, by adding an additional conversion amplifier crystal, such as Fe:ZnSe, the amplified 3 micron emission may be used as a pump source to amplify the 4 micron emission. Accordingly, one skilled in the art recognizes that the direct or self-amplification process and systems described herein are applicable beyond the non-limiting embodiments described herein.

In addition to the publications referenced above, the following articles, which are incorporated herein by reference, provide examples of what is considered to be within the skill in the art and provide additional technical details for various materials and systems which may be used in the inventive direct amplification systems and processes described herein: Li et al., Mid-infrared passively switched pulsed dual wavelength Ho(3+)-doped fluoride fiber laser at 3 µm and 2 µm, Sci Rep. 2015 Jun. 4; 5:10770; Rudy, Mid-IR Lasers: Power and pulse capability ramp up for mid-IR lasers, Laser Focus World, Vol. 50, Issue 5, May 2015; N. P. Barnes et al., Ho:Tm:Er:LuAG and Two Wavelength Oscillation, Solid State Lasers 10, 211 (1997); Walsh, Brian M., Dual wavelength lasers, Laser physics 20.3 (2010): 622-634; Li et al, "Dual wavelength Q-switched cascade laser," Opt. Lett. 37, 2208-2210 (2012); Jia et al., Simultaneous Q-Switching of a $Tm^{3+}$:ZBLAN Fiber Laser at 1.9 µm and 2.3 µm Using Graphene, IEEE Photonics Technology Letters, vol. 29, no. 4, pp. 405-408, Feb. 15, 15 2017; C. Bethea, Megawatt power at 1.318µ in Nd3+:YAG and simultaneous oscillation at both 1.06 and 1.318 µm, IEEE Journal of Quantum Electronics, vol. 9, no. 2, pp. 254-254, February 1973; Shi, W. Q., et al., Simultaneous, multiple wavelength lasing of (Er, Nd): Y3Al5O12, Applied Physics Letters 51.16 (1987): 1218-1220; and Walsh et al, "Cr: Er: Tm: Ho: yttrium aluminum garnet laser exhibiting dual wavelength lasing at 2.1 and 2.9 µm: Spectroscopy and laser performance, Journal of Applied Physics 91.1 (2002): 11-17.

The potential applications for this device are numerous and include, for example, optical pump source for solid state lasers, optical parametric oscillators, dental and medical lasers and biomedical applications, chemical sensing, organic molecular fingerprints, LIDAR, free space communications, environmental monitoring, materials processing, industrial process control and several military applications (e.g., IR countermeasures).

One skilled in the art will recognize that there are various alternative materials, configurations and applications which are necessarily foreseen by the description of the embodiments herein. Such variations are considered to be within the scope of the present embodiments.

The invention claimed is:
1. A cascaded dual-output laser system comprising:
    a lasing material formed from a rare-earth ion doped material;

a pump component for pumping the lasing material to produce at least two optical signals having non-overlapping first and second wavelengths; and a conversion amplifier for receiving the at least two optical signals, wherein the conversion amplifier is formed of a material that absorbs photons having the first wavelength and responsive to said absorption emits photons having the second wavelength.

2. The cascaded dual-output laser system of the claim 1, wherein the lasing material includes a sesquioxide.

3. The cascaded dual-output laser system of the claim 2, where in the lasing material is Er-doped yttria ($Y_2O_3$).

4. The cascaded dual-output laser system of the claim 1, wherein the non-overlapping first and second wavelengths are approximately 1.6 μm and 2.7 μm.

5. The cascaded dual-output laser system of the claim 1, wherein the conversion amplifier is formed of Cr:ZnSe.

6. The cascaded dual-output laser system of the claim 1, wherein the at least two optical signals are collinear.

7. The cascaded dual-output laser system of the claim 1, wherein the lasing material and pump are operated in a cryogenic cooler.

8. The cascaded dual-output laser system of claim 1, wherein the lasing material includes a dopant selected from the group consisting of
dysprosium (Dy), erbium (Er), europium (Eu), holmium (Ho), lanthanum (La), lutetium (Lu), neodymium (Nd), praseodymium (Pr), promethium (Pm), samarium (Sm), scandium (Sc), terbium (Tb), thulium (Tm), and yttrium (Y).

9. A solid-state laser comprising:
an oscillation cavity including at least a first mirror, a gain material and a second material for generating a first and a second emission beam having different wavelengths; and
a conversion amplifier for converting the first emission beam into the second emission beam.

10. The solid-state laser of claim 9, wherein the conversion amplifier is located within the oscillation cavity.

11. The solid-state laser of claim 9, wherein the conversion amplifier is located external to the oscillation cavity.

12. The solid-state laser of claim 9, wherein the conversion amplifier is comprised of a transition metal doped II-VI semiconductor.

13. The solid-state laser of claim 12, wherein the conversion amplifier comprises Cr:ZnSe/Cr:ZnS.

14. The solid-state laser of claim 9, wherein the different wavelengths are approximately 1.5 μm and 3.0 μm.

15. The solid-state laser of claim 12, wherein the solid-state medium includes a dopant selected from the group consisting of
dysprosium (Dy), erbium (Er), europium (Eu), holmium (Ho), lanthanum (La), lutetium (Lu), neodymium (Nd), praseodymium (Pr), promethium (Pm), samarium (Sm), scandium (Sc), terbium (Tb), thulium (Tm), and yttrium (Y).

16. A rare earth-doped direct amplification laser system comprising:
a multiple wavelength emission rare earth-doped laser configured to emit at a first, second and third non-overlapping wavelengths; and
a first conversion amplifier for receiving the first wavelength emissions and converting to the second wavelength.

17. The rare earth-doped direct amplification laser system of claim 16, further comprising:
a second conversion amplifier for receiving the second wavelength emissions and converting the second wavelengths to a third of the multiple wavelengths.

18. The rare earth-doped direct amplification laser system of claim 16, wherein the multiple wavelength emissions are selected from the group consisting of 1.5 microns, 1.6 microns, 2.0 microns, 2.1 microns, 2.7 microns, 3.0 microns, and 4.0 microns.

19. The rare earth-doped direct amplification laser system of claim 16, wherein the rare-earth dopant is selected from the group consisting of dysprosium (Dy), erbium (Er), europium (Eu), holmium (Ho), lanthanum (La), lutetium (Lu), neodymium (Nd), praseodymium (Pr), promethium (Pm), samarium (Sm), scandium (Sc), terbium (Tb), thulium (Tm), and yttrium (Y).

20. The rare earth-doped direct amplification laser system of claim 17, wherein the first and second conversion amplifiers are comprised of one or more materials selected from the group consisting of: a solid-state medium and a nonlinear medium.

* * * * *